US011246076B2

(12) United States Patent
Wang et al.

(10) Patent No.: US 11,246,076 B2
(45) Date of Patent: Feb. 8, 2022

(54) WIRELESS NETWORK HANDOVER METHOD AND APPARATUS BASED ON DISTANCE CHANGE BETWEEN TERMINAL AND ACCESS POINTS

(71) Applicant: HUAWEI TECHNOLOGIES CO., LTD., Shenzhen (CN)

(72) Inventors: Yungui Wang, Nanjing (CN); Fuqing Sun, Nanjing (CN); Ruifeng Wang, Nanjing (CN); Zhijian He, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 53 days.

(21) Appl. No.: 16/438,632

(22) Filed: Jun. 12, 2019

(65) Prior Publication Data

US 2019/0297553 A1    Sep. 26, 2019

Related U.S. Application Data

(63) Continuation of application No. PCT/CN2017/115299, filed on Dec. 8, 2017.

(30) Foreign Application Priority Data

Dec. 12, 2016    (CN) .......................... 201611144017.X

(51) Int. Cl.
    *H04W 36/30*    (2009.01)
    *H04L 12/26*    (2006.01)
    (Continued)

(52) U.S. Cl.
    CPC ......... *H04W 36/30* (2013.01); *H04L 43/0864* (2013.01); *H04W 36/00* (2013.01);
    (Continued)

(58) Field of Classification Search
    CPC . H04W 36/30; H04W 36/00; H04W 36/0033; H04W 36/0079; H04W 36/08; H04W 36/0083; H04B 17/318
    See application file for complete search history.

(56) References Cited

U.S. PATENT DOCUMENTS

| 7,349,699 B1 | 3/2008 | Kelly et al. |
| 9,107,134 B1 | 8/2015 | Belser et al. |
| (Continued) |

FOREIGN PATENT DOCUMENTS

| CN | 101557625 A | 10/2009 |
| CN | 101883312 A | 11/2010 |
| (Continued) |

OTHER PUBLICATIONS

"IEEE Std 802.11r™-2008, IEEE Standard for Information technology—Telecommunications and information exchange between systems—Local and metropolitan area networks—Specific requirements, Part 11: Wireless LAN Medium Access Control (MAC) and Physical Layer (PHY) Specifications. Amendment 2: Fast Basic Service Set (BSS) Transition, Jul. 15, 2008, 126 pages".

(Continued)

*Primary Examiner* — Ian N Moore
*Assistant Examiner* — Sun Jong Kim
(74) *Attorney, Agent, or Firm* — Rimon PC

(57) ABSTRACT

A wireless network handover method and apparatus are provided, relating to the communications field, and capable of resolving a problem of a service packet loss during a handover of a terminal. The method includes: obtaining, by a handover device, a distance between a terminal and a current access point, to determine a change trend of the distance between the terminal and the current access point; and if the handover device determines, based on a correspondence between the change trend and a neighboring (Continued)

access point of the current access point, a target access point to which the terminal is to be handed over, handing over, by the handover device, the terminal from the current access point to the target access point. Forgoing solution is applied to a scenario in which a terminal is handed over and roams between Wi-Fi networks on a highway.

15 Claims, 10 Drawing Sheets

(51) Int. Cl.

| | | |
|---|---|---|
| *H04W 36/00* | (2009.01) | |
| *H04W 36/08* | (2009.01) | |
| *H04W 36/32* | (2009.01) | |
| *H04W 36/38* | (2009.01) | |
| *H04W 36/18* | (2009.01) | |
| *H04B 17/318* | (2015.01) | |
| *H04W 84/12* | (2009.01) | |

(52) U.S. Cl.
CPC ....... *H04W 36/0094* (2013.01); *H04W 36/08* (2013.01); *H04W 36/18* (2013.01); *H04W 36/32* (2013.01); *H04W 36/38* (2013.01); *H04B 17/318* (2015.01); *H04W 84/12* (2013.01)

(56) References Cited

U.S. PATENT DOCUMENTS

| | | | |
|---|---|---|---|
| 9,467,922 B1 | 10/2016 | Buchmueller et al. | |
| 2007/0060126 A1* | 3/2007 | Taniguchi | H04W 36/32 455/436 |
| 2009/0247150 A1* | 10/2009 | Fischer | H04W 24/10 455/425 |
| 2009/0247169 A1* | 10/2009 | Kawasaki | H04W 36/32 455/440 |
| 2010/0167744 A1* | 7/2010 | Grob-Lipski | H04W 36/0088 455/436 |
| 2010/0232389 A1 | 9/2010 | Park | |
| 2011/0183672 A1* | 7/2011 | Jeong | H04W 36/30 455/436 |
| 2011/0242522 A1 | 10/2011 | Etkin et al. | |
| 2011/0267969 A1 | 11/2011 | Ceccherini et al. | |
| 2012/0108240 A1* | 5/2012 | Liu | H04W 36/0033 455/436 |
| 2014/0120955 A1 | 5/2014 | Padden et al. | |
| 2015/0264614 A1 | 9/2015 | Stager et al. | |
| 2015/0304929 A1 | 10/2015 | Hua et al. | |
| 2016/0212675 A1 | 7/2016 | Choi | |
| 2016/0269964 A1* | 9/2016 | Murray | H04W 36/32 |
| 2017/0150384 A1* | 5/2017 | Rune | H04W 72/085 |
| 2018/0070295 A1* | 3/2018 | Henry | H04W 36/00835 |

FOREIGN PATENT DOCUMENTS

| | | |
|---|---|---|
| CN | 101945454 A | 1/2011 |
| CN | 102769879 A | 11/2012 |
| CN | 103634863 A | 3/2014 |
| CN | 103686890 A | 3/2014 |
| CN | 104066134 A | 9/2014 |
| CN | 104394563 A | 3/2015 |
| CN | 104735731 A | 6/2015 |
| CN | 104980977 A | 10/2015 |
| CN | 105916180 A | 8/2016 |
| EP | 1418711 A2 | 5/2004 |
| EP | 1531645 A1 | 5/2005 |
| JP | 2007043376 A | 2/2007 |
| JP | 2009239766 A | 10/2009 |
| JP | 2012509620 A | 4/2012 |
| WO | 0028768 A1 | 5/2000 |
| WO | 2014029870 A2 | 2/2014 |
| WO | 2016095139 A1 | 6/2016 |

OTHER PUBLICATIONS

J. Loughney (editor) et al.,"Context Transfer Protocol; draft-ietf-seamoby-ctp-01",Internet Draft ,dated Mar. 2003, total 22 pages.

* cited by examiner

WIRELESS NETWORK HANDOVER METHOD AND APPARATUS BASED ON DISTANCE CHANGE BETWEEN TERMINAL AND ACCESS POINTS

CROSS-REFERENCE TO RELATED APPLICATIONS

This application is a continuation of International Application No. PCT/CN2017/115299, filed on Dec. 8, 2017, which claims priority to Chinese Patent Application No. 201611144017.X, filed on Dec. 12, 2016. The disclosures of the aforementioned applications are hereby incorporated by reference in their entireties.

TECHNICAL FIELD

This application relates to the communications field, and in particular, to a wireless network handover method and apparatus.

BACKGROUND

With development of technologies, a high-gain directional antenna may be customized for a wireless local area network (WLAN). For example, an 18 dBi antenna is customized, so that a coverage distance reaches more than 600 meters. Therefore, the WLAN may be deployed near a highway. In a relatively simple and feasible deployment mode shown in FIG. 1, a wireless access point (AP) in a WLAN is deployed near a highway. A user in a vehicle uses a wireless terminal to connect to the AP near the highway, and then the AP sends data to a switch or a router, so that the terminal can access the Internet. On the highway, the terminal moves fast with the high-speed moving vehicle, and therefore the terminal needs to fast roam between APs.

A conventional roaming method is shown in FIG. 2. First, roaming is triggered. Usually, when a terminal detects that a signal of a network is weak, the terminal performs scanning again to discover new networks, and then selects a network with a better signal. Then the terminal initiates a roaming handover process to a new AP based on a reassociation. After the reassociation is successful, authentication is performed again and a pairwise master key (PMK) is negotiated. This step generally requires interaction with an access controller (AC). Then a four-way handshake is performed to negotiate a key. After the roaming handover, a disassociation process is performed. To be specific, a previously associated old AP may delete association information of a user. An accelerated roaming method is a PMK cache solution. After a roaming handover of a terminal, a complete terminal authentication procedure is no longer initiated, but information about a PMK that is successfully negotiated by an old AP before the handover is used to directly perform a pairwise transient key (PTK) negotiation process to reduce a handover time. Another handover solution is an 802.11r solution. The solution has two critical features. 1. After a terminal roams, a complete authentication process is not performed, but a PMK obtained by an old AP through authentication before roaming is used to directly generate a new PMK (b), and the PMK (b) is used to negotiate a PTK. 2. A four-way handshake for key negotiation for negotiating a PTK is combined with an existing authentication and reassociation process of the WLAN, and an independent four-way handshake for key negotiation is no longer performed for negotiating a PTK.

Both the foregoing two fast roaming solutions are improvements over the conventional roaming solution, and achieve an objective of reducing a packet loss by maximally reducing a roaming handover time. However, a problem of a packet loss during the roaming handover is not resolved in a real sense. In the roaming handover process of the terminal, a packet loss may cause temporary frame freezing or even an interruption of a service. If the service is a voice service, temporary silence may be caused. If the service is a video service, temporary frame freezing or artifacts may occur. For example, on a highway, the terminal is handed over between APs very frequently, and generally, a handover needs to be performed every 10 seconds. This causes more adverse impact on the service.

SUMMARY

This application provides a wireless network handover method and apparatus to resolve a problem of a service packet loss during a handover of a terminal between networks.

According to one aspect, a wireless network handover method is provided and includes: obtaining, by a handover device, a distance between a terminal and a current access point, to determine a change trend of the distance between the terminal and the current access point; and if the handover device determines, based on a correspondence between the change trend and a neighboring access point of the current access point, a target access point to which the terminal is to be handed over, handing over, by the handover device, the terminal from the current access point to the target access point. The handover device may be an AC, a switch, a router, a standalone personal computer (PC) server, or an AP. APs include the current access point and the target access point. In this way, the handover device may determine the target access point to which the terminal is to be handed over, and the handover device may initiate a handover process. The terminal may not be aware of the whole handover process. Therefore, the terminal does not break a connection to the access point in the handover process, and correspondingly a packet loss due to the break of the connection to the access point does not occur. Therefore, a problem of a service packet loss during the handover of the terminal between networks is resolved.

In a possible design, an attribute of the neighboring access point includes face to face and/or back to back, where the face to face is used to indicate that a distance between the current access point and the neighboring access point is greater than or equal to a first threshold, the back to back is used to indicate that the distance between the current access point and the neighboring access point is less than or equal to a second threshold, and the first threshold is greater than the second threshold; and that the handover device determines, based on a correspondence between the change trend and a neighboring access point of the current access point, a target access point to which the terminal is to be handed over includes: if the change trend is a falling trend, determining, by the handover device that the neighboring access point whose attribute is back to back is the target access point; or if the change trend is a rising trend, determining, by the handover device that the neighboring access point whose attribute is face to face is the target access point. In this way, if the handover device determines that the distance from the terminal to the current access point tends to rise, the handover device may determine that the target access point to which the terminal is to be handed over is a face-to-face neighboring access point; or if the handover device determines that the distance from the terminal to the current access point tends to fall, the handover device may determine that the target access point to which the terminal is to be handed over is a back-to-back neighboring access point. For example, as shown in FIG. 3, two APs may be deployed on each pole. An AP 0 is a back-to-back neighboring access point of an AP 1, and an AP 2 is a face-to-face neighboring access point of the AP 1. If the current access point of the terminal is the AP 1, when a distance from the terminal to the AP 1 tends to rise, the handover device may determine that the target access point to which the terminal is to be handed over is a face-to-face neighboring access point, that is, the AP 2; or when the distance from the terminal to the AP 1 tends to fall, the handover device may determine that the target access point to which the terminal is to be handed over is a back-to-back neighboring access point, that is, the AP 0.

In a possible design, the handing over, by the handover device, the terminal from the current access point to the target access point includes: if the target access point is the face-to-face neighboring access point, and the distance between the terminal and the current access point is greater than or equal to a first handover distance threshold, handing over, by the handover device, the terminal from the current access point to the target access point; or if the target access point is the back-to-back neighboring access point, and the distance between the terminal and the current access point is less than or equal to a second handover distance threshold, handing over, by the handover device, the terminal from the current access point to the target access point.

In a possible design, if the handover device determines, based on the correspondence between the change trend and the neighboring access point of the current access point, that the terminal fails to be handed over to the target access point, the method further includes: if the handover device receives a handover request sent by the target access point, where the handover request is used to request to switch a connection between the terminal and the current access point to the target access point, determining, by the handover device, whether a received signal strength indicator (RSSI) that is between the terminal and the target access point and sent by the target access point reaches a third threshold; and if determining yes, handing over, by the handover device, the terminal from the current access point to the target access point.

In a possible design, if the terminal fails to be handed over from the current access point to the target access point after the handover device hands over the terminal from the current access point to the target access point, the method further includes: if the handover device receives a handover request sent by the target access point, where the handover request is used to request to switch a connection between the terminal and the current access point to the target access point, determining, by the handover device, whether a received signal strength indicator RSSI that is between the terminal and the target access point and sent by the target access point reaches a third threshold; and if determining yes, handing over, by the handover device, the terminal from the current access point to the target access point. In this way, when the handover device fails to obtain the correspondence between the change trend and the neighboring access point of the current access point due to a poor network signal, or does not hand over the terminal to the target access point in time due to other reasons, and the terminal already moves to a coverage area of the target access point, the handover device may determine the RSSI sent by the target access point; and if the RSSI reaches the third threshold, the handover device may initiate a handover process, and therefore hand over the terminal to the target access point.

In a possible design, the handing over, by the handover device, the terminal from the current access point to the target access point includes: instructing, by the handover device, the current access point to send context information of the terminal and the current access point to the target access point, or sending, by the handover device, context information obtained from the current access point to the target access point, or instructing, by the handover device, the target access point to set context information to an active state. In this way, the handover device may instruct the current access point to send the context information of the terminal and the current access point to the target access point, or the handover device sends the context information obtained from the current access point to the target access point, or the handover device instructs the target access point to set the context information to the active state, or use other methods to perform a handover, so that the terminal is handed over to the target access point. There is no need to perform an authentication process between the terminal and the target access point, and therefore the terminal is handed over between networks without being aware of the handover.

In a possible design, if the handover device instructs the target access point to set the context information to the active state, the method further includes: receiving, by the handover device, the context information sent by the current access point, and sending the context information to the neighboring access point. It may be understood that, after the handover device receives the context information sent by the current access point, and sends the context information to the neighboring access point, if the target access point receives the context information, the context information received by the target access point may be set to a pending state. Afterward, when the handover device initiates a handover, the handover device only needs to instruct the target access point to set the context information to the active state.

In a possible design, the obtaining, by a handover device, a distance between a terminal and a current access point includes: obtaining, by the handover device, a round trip time (RTT) between the terminal and the current access point; and obtaining, by the handover device, the distance between the terminal and the current access point based on the RTT. In other words, the handover device may calculate the distance between the terminal and the current access point based on collected RTTs.

In a possible design, the method includes: after the handover device determines that the terminal accesses the current access point, discontinuously obtaining, by the handover device, an RTT between the terminal and the current access point at a first frequency, and obtaining the distance between the terminal and the current access point based on the RTT; and if the distance between the terminal and the current access point is greater than or equal to a first pre-handover distance threshold, or the distance between the terminal and the current access point is less than or equal to a second pre-handover distance threshold, obtaining, by the handover device, an RTT between the terminal and the current access point at a second frequency, where the second frequency is higher than the first frequency, and obtaining the distance between the terminal and the current access point based on the RTT; or if the distance between the terminal and the current access point is greater than or equal to a first handover distance threshold, or the distance between the terminal and the current access point is less than or equal to a second handover distance threshold, stopping, by the handover device, obtaining an RTT between the terminal and the current access point. In this way, the handover device collects RTTs at the second frequency only when the handover device is to perform a handover, but discontinuously collects RTTs at the first frequency lower than the second frequency before the handover, and stops collecting RTTs during the handover. This can effectively reduce overheads of collecting RTTs.

In a possible design, the method further includes: if the terminal fails to be handed over from the current access point to the target access point after the handover device hands over the terminal from the current access point to the target access point, obtaining, by the handover device, an RTT between the terminal and the current access point at a third frequency, where the third frequency is higher than or equal to the first frequency, and is lower than or equal to the second frequency, and obtaining the distance between the terminal and the current access point based on the RTT.

According to another aspect, a handover device is provided and includes: an obtaining unit, configured to obtain a distance between a terminal and a current access point, to determine a change trend of the distance between the terminal and the current access point; and a handover unit, configured to: if determining, based on a correspondence between the change trend and a neighboring access point of the current access point, a target access point to which the terminal is to be handed over, hand over the terminal from the current access point to the target access point.

In a possible design, an attribute of the neighboring access point includes face to face and/or back to back, where the face to face is used to indicate that a distance between the current access point and the neighboring access point is greater than or equal to a first threshold, the back to back is used to indicate that the distance between the current access point and the neighboring access point is less than or equal to a second threshold, and the first threshold is greater than the second threshold; and the handover unit is configured to: if the change trend is a falling trend, determine that the attribute of the neighboring access point is back to back, and determine, based on the correspondence, that the neighboring access point whose attribute is back to back is the target access point; or if the change trend is a rising trend, determine that the attribute of the neighboring access point is face to face, and determine, based on the correspondence, that the neighboring access point whose attribute is face to face is the target access point.

In a possible design, the handover unit is configured to: if the target access point is the face-to-face neighboring access point, and the distance between the terminal and the current access point is greater than or equal to a first handover distance threshold, hand over the terminal from the current access point to the target access point; or if the target access point is the back-to-back neighboring access point, and the distance between the terminal and the current access point is less than or equal to a second handover distance threshold, hand over the terminal from the current access point to the target access point.

In a possible design, if the handover device determines, based on the correspondence between the change trend and the neighboring access point of the current access point, that the terminal fails to be handed over to the target access point, the handover unit is further configured to: if a handover request sent by the target access point is received, where the handover request is used to request to switch a connection between the terminal and the current access point to the target access point, determine, by the handover device, whether a received signal strength indicator RSSI that is between the terminal and the target access point and sent by the target access point reaches a third threshold; and if determining yes, hand over, by the handover device, the terminal from the current access point to the target access point.

In a possible design, if the terminal fails to be handed over from the current access point to the target access point after the handover device hands over the terminal from the current access point to the target access point, the handover unit is further configured to: if a handover request sent by the target access point is received, where the handover request is used to request to switch a connection between the terminal and the current access point to the target access point, determine whether a received signal strength indicator RSSI that is between the terminal and the target access point and sent by the target access point reaches a third threshold; and if determining yes, hand over, by the handover device, the terminal from the current access point to the target access point.

In a possible design, the handover unit is configured to: instruct the current access point to send context information of the terminal and the current access point to the target access point, or send context information obtained from the current access point to the target access point, or instruct the target access point to set context information to an active state.

In a possible design, if the handover device instructs the target access point to set the context information to the active state, the handover device further includes a receiving unit and a sending unit, where the receiving unit is configured to receive the context information sent by the current access point, and the sending unit is configured to send the context information to the neighboring access point.

In a possible design, the obtaining unit is configured to: obtain a round trip time RTT between the terminal and the current access point; and obtain the distance between the terminal and the current access point based on the RTT.

In a possible design, the obtaining unit is further configured to: after it is determined that the terminal accesses the current access point, discontinuously obtain an RTT between the terminal and the current access point at a first frequency, and obtain the distance between the terminal and the current access point based on the RTT; and if the distance between the terminal and the current access point is greater than or equal to a first pre-handover distance threshold, or the distance between the terminal and the current access point is less than or equal to a second pre-handover distance threshold, obtain an RTT between the terminal and the current access point at a second frequency, where the second frequency is higher than the first frequency, and obtain the distance between the terminal and the current access point based on the RTT; or if the distance between the terminal and the current access point is greater than or equal to a first handover distance threshold, or the distance between the terminal and the current access point is less than or equal to a second handover distance threshold, stop obtaining an RTT between the terminal and the current access point.

In a possible design, the obtaining unit is further configured to: if the terminal fails to be handed over from the current access point to the target access point after the handover device hands over the terminal from the current access point to the target access point, obtain an RTT between the terminal and the current access point at a third frequency, where the third frequency is higher than or equal to the first frequency, and is lower than or equal to the second frequency, and obtain the distance between the terminal and the current access point based on the RTT.

According to still another aspect, a handover device is provided and includes: a receiver, configured to obtain a distance between a terminal and a current access point, to determine a change trend of the distance between the terminal and the current access point; and a processor, configured to: if determining, based on a correspondence between the change trend and a neighboring access point of the current access point, a target access point to which the terminal is to be handed over, switch a connection between the terminal and the current access point to a connection between the terminal and the target access point.

In a possible design, an attribute of the neighboring access point includes face to face and/or back to back, where the face to face is used to indicate that a distance between the current access point and the neighboring access point is greater than or equal to a first threshold, the back to back is used to indicate that the distance between the current access point and the neighboring access point is less than or equal to a second threshold, and the first threshold is greater than the second threshold; and the processor is configured to: if the change trend is a falling trend, determine, based on the correspondence, that the neighboring access point whose attribute is back to back is the target access point; or if the change trend is a rising trend, determine, based on the correspondence, that the neighboring access point whose attribute is face to face is the target access point.

In a possible design, the processor is configured to: if the target access point is the face-to-face neighboring access point, and the distance between the terminal and the current access point is greater than or equal to a first handover distance threshold, hand over the terminal from the current access point to the target access point; or if the target access point is the back-to-back neighboring access point, and the distance between the terminal and the current access point is less than or equal to a second handover distance threshold, hand over the terminal from the current access point to the target access point.

In a possible design, if the handover device determines, based on the correspondence between the change trend and the neighboring access point of the current access point, that the terminal fails to be handed over to the target access point, the processor is further configured to: if a handover request sent by the target access point is received, where the handover request is used to request to switch a connection between the terminal and the current access point to the target access point, determine, by the handover device, whether a received signal strength indicator RSSI that is between the terminal and the target access point and sent by the target access point reaches a third threshold; and if determining yes, hand over, by the handover device, the terminal from the current access point to the target access point.

In a possible design, if the terminal fails to be handed over from the current access point to the target access point after the handover device hands over the terminal from the current access point to the target access point, the processor is further configured to: if a handover request sent by the target access point is received, where the handover request is used to request to switch a connection between the terminal and the current access point to the target access point, determine whether a received signal strength indicator RSSI that is between the terminal and the target access point and sent by the target access point reaches a third threshold; and if determining yes, hand over, by the handover device, the terminal from the current access point to the target access point.

In a possible design, the processor is further configured to: instruct the current access point to send context information of the terminal and the current access point to the target access point, or send context information obtained from the current access point to the target access point, or instruct the target access point to set context information to an active state.

According to still another aspect, this application provides a computer storage medium, configured to store a computer software instruction used by the foregoing handover device. The computer storage medium includes a program designed for executing the foregoing aspects.

In comparison with a handover process initiated by a terminal, this application provides a method for initiating a terminal handover by a handover device. The handover device may determine, based on a correspondence between a change trend of a distance between a terminal and a current access point and a neighboring access point of the current access point, a target access point to which the terminal is to be handed over. Then the handover device switches a connection between the terminal and the current access point to a connection between the terminal and the target access point. In this way, the terminal may not be aware of a handover process. Therefore, a problem of a service packet loss during the handover of the terminal between networks is resolved.

DESCRIPTION OF EMBODIMENTS

Embodiments of this application may be applied to a scenario in which a terminal is handed over and roams between Wi-Fi networks on a highway, or may be applied to other scenarios. This is not limited in this application.

A system architecture in the embodiments of this application may include a handover device, an access point, and a terminal. The access point may be a wireless access point or a wireless router in a WLAN, may be configured to provide a basic access service, and may be configured to access the Internet. Access points may include a current access point, a neighboring access point, and a target access point. The current access point may have two neighboring access points, which may be respectively a face-to-face neighboring access point and a back-to-back neighboring access point. The target access point may be the face-to-face neighboring access point or the back-to-back neighboring access point. The handover device may be an AP, an AC, a switch, a router, or a standalone personal computer server. The AP may include the current access point or the target access point. In this application, a method of the handover device may be performed by a logical entity. The logical entity may be understood as a handover engine, configured to switch a connection between the terminal and the current access point to a connection between the terminal and the target access point. The terminal may be a device or an apparatus such as a personal computer PC, a mobile phone, a tablet computer (pad), an intelligent learning machine, an intelligent game console, a smart TV, smart glasses, or a smartwatch.

Figure 1:
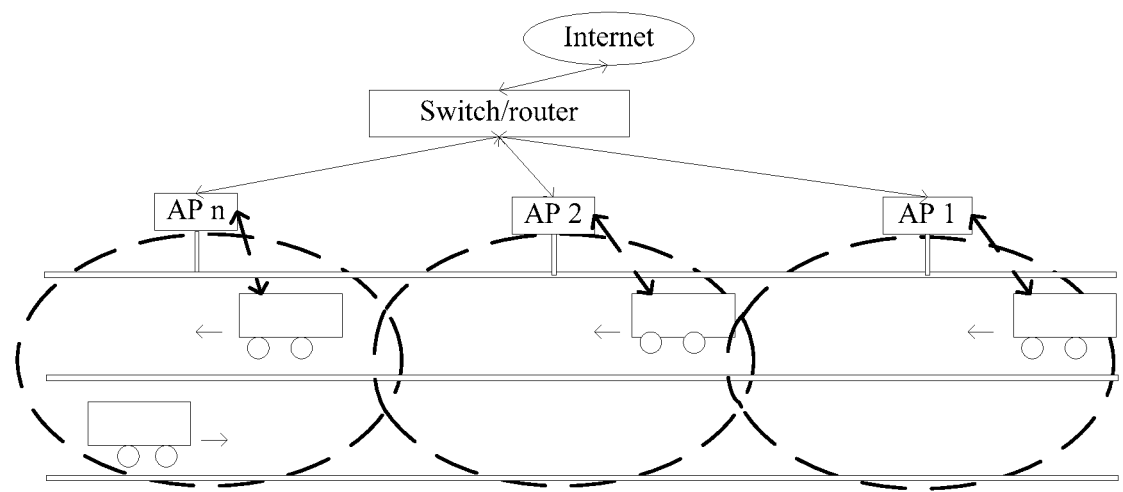
FIG. 1 is a schematic diagram of deploying WLANs near a highway according to an embodiment of the present invention.
Figure 2:
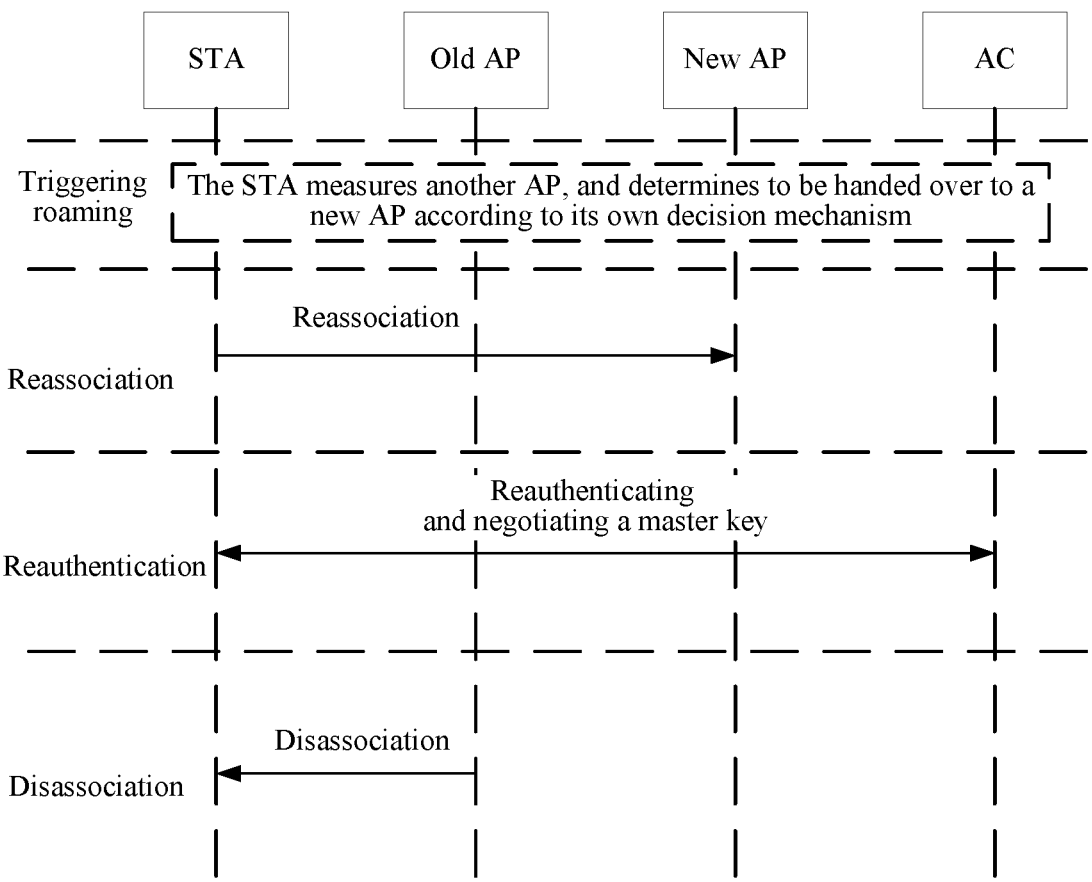
FIG. 2 is a schematic diagram of a process of a conventional roaming method according to an embodiment of the present invention.
Figure 3:
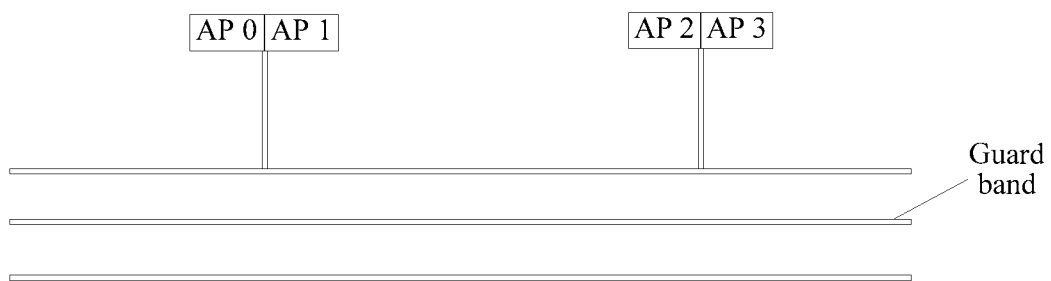
FIG. 3 is a schematic diagram of deploying APs according to an embodiment of the present invention.

As can be known from the foregoing description, APs in a Wi-Fi network on a highway may be linearly deployed. A current AP may have two neighboring APs, which may be referred to as a back-to-back neighboring AP and a face-to-face neighboring AP. Each AP may cover one direction. The back-to-back neighboring AP may be an AP that is very close to the current AP, for example, may be another AP that is deployed on a same pole. The face-to-face neighboring AP may be an AP that is relatively far away from the current AP, for example, may be a face-to-face AP that is deployed on an adjacent pole. For example, as shown in FIG. 3, neighboring APs of an AP 1 may be set to an AP 0 and an AP 2, where a back-to-back neighboring AP of the AP 1 is the AP 0, and a face-to-face neighboring AP of the AP 1 is the AP 2; neighboring APs of the AP 2 may be set to an AP 3 and the AP 1, where a back-to-back neighboring AP of the AP 2 is the AP 3, and a face-to-face neighboring AP of the AP 2 is the AP 1. In network planning, it may be specified that the handover device stores an attribute and a corresponding identifier of the neighboring access point of the current access point. For example, assuming that the current access point is the AP 1, and the neighboring access points of the AP 1 are the AP 0 and the AP 2, and attributes of the neighboring access points include face to face and back to back, the attributes and corresponding identifiers of the neighboring access points of the current access point may be: the corresponding identifier of the neighboring access point with the face-to-face attribute is the AP 2, and the corresponding identifier of the neighboring access point with the back-to-back attribute is the AP 0.

To adapt to different network deployment, this application is applicable to inter-frequency deployment in which a same channel is configured for all APs in a whole network or different channels are configured for all APs in a whole network.

Figure 4:
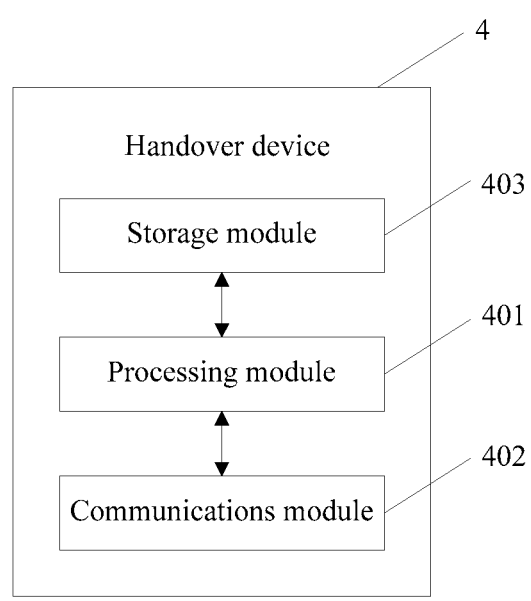
FIG. 4 is a schematic structural diagram of a handover device according to an embodiment of the present invention.

FIG. 4 is a schematic structural diagram of a handover device according to an embodiment of this application. In this application, the handover device may include a processing module 401, a communications module 402, and a storage module 403. The processing module 401 is configured to control various hardware apparatuses, application software, and the like of the handover device. The communications module 402 is configured to receive, in communication modes such as Long Term Evolution (LTE) and Wi-Fi, instructions sent by other devices, and may also send data of the handover device to the other devices. The storage module 403 is configured to store a software program of the handover device, store data, run the software, and the like.

A process of this application is approximately as follows: The handover device obtains a change trend of a distance between a terminal and a current access point. Because of linear deployment on a highway, a change trend of the terminal is definite in a time period, and the change trend may be larger or smaller. After obtaining a correspondence between the change trend and a neighboring access point of the current access point, the handover device determines a target access point to which the terminal is to be handed over. Then the handover device switches a connection between the terminal and the current access point to a connection between the terminal and the target access point. It should be especially noted that, in a process in which the terminal accesses the current access point until the terminal is handed over to the target access point, the handover device may have different states of collecting round trip times (RTT) between the terminal and the current access point. In addition, every time the handover device collects RTTs, the handover device calculates a distance from the terminal to the current access point based on the RTTs.

Figure 5:
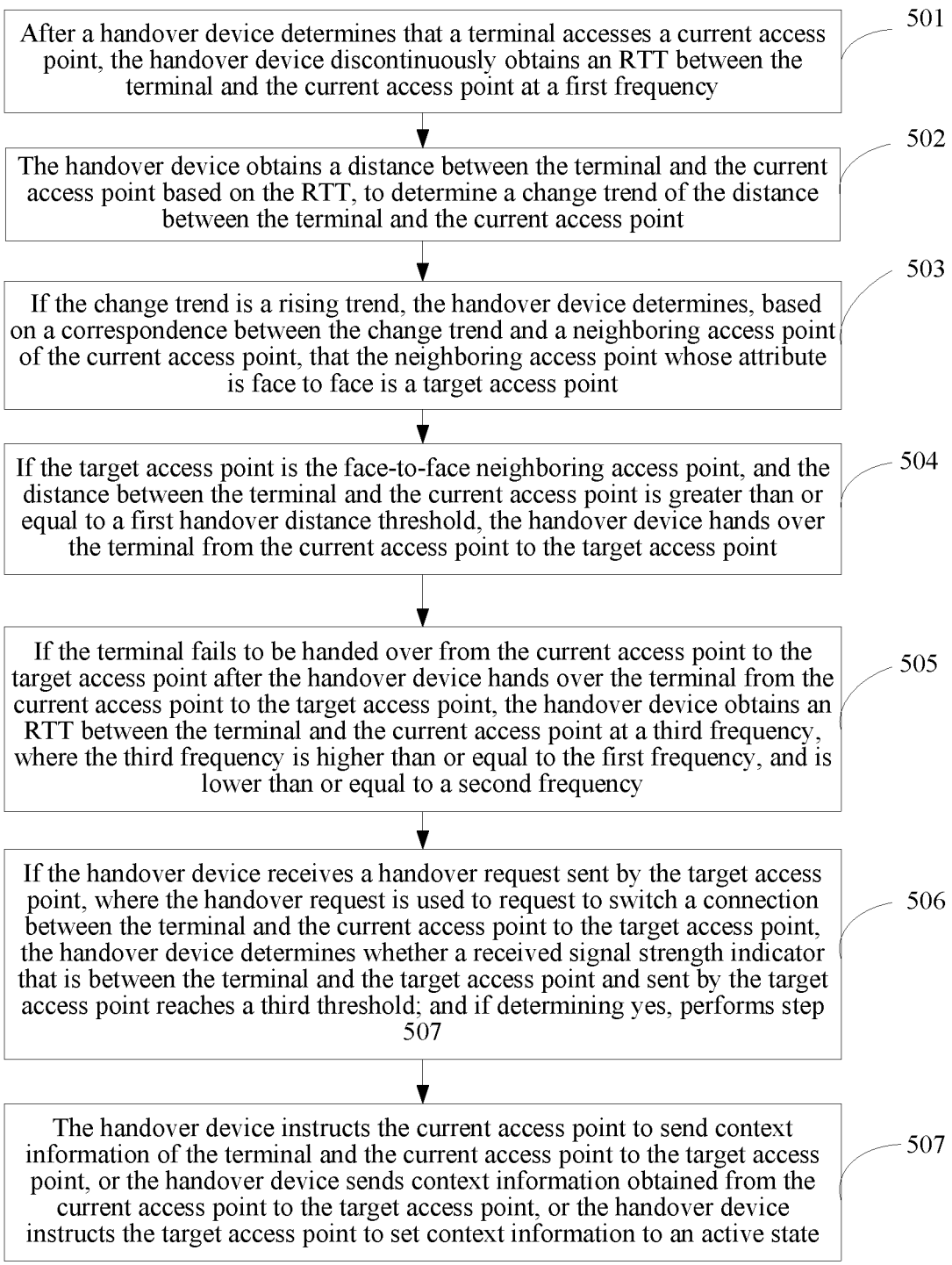
FIG. 5 is a schematic flowchart of a wireless network handover method according to an embodiment of the present invention.

An embodiment of this application provides a wireless network handover method. As shown in FIG. 5, the method includes the following steps.

501. After a handover device determines that a terminal accesses a current access point, the handover device discontinuously obtains an RTT between the terminal and the current access point at a first frequency.

The RTT is a difference between a time of sending a request packet by an AP to the terminal and a time of receiving a response packet by the AP from the terminal.

Because there are a lot of terminals in a network, if the handover device periodically detects and collects RTTs at a relatively high frequency for each terminal, relatively high overheads are caused. Therefore, after the handover device determines that the terminal accesses the current access point, the handover device may discontinuously obtain an RTT between the terminal and the current access point at the first frequency.

For example, the handover device may collect RTTs between the terminal and the current access point in a manner of collecting RTTs every second continuously for four seconds, stopping collection for two seconds, then continuously collecting RTTs for three seconds, and stopping collection for one second. Herein, a state in which the handover device discontinuously obtains an RTT between the terminal and the current access point at the first frequency is referred to as a stable state.

The handover device may instruct the current AP to collect RTTs, and further obtain the RTTs between the current access point and the terminal from the current AP. Specifically, the handover device may instruct the current AP to send a request packet to the terminal; after receiving the request packet, the terminal sends a response packet to the current AP; and the current AP calculates a difference between a sending time and a receiving time to obtain an RTT, and then sends the obtained RTT to the handover device.

In addition, if the handover device determines that a process of accessing the current access point by the terminal is initiated by the terminal, the handover device may obtain an RTT between the terminal and the current AP at a third frequency, for example, periodically collect RTTs at a frequency of three times per second. Herein, a state of obtaining an RTT between the terminal and the current access point periodically by the handover device is referred to as an initial state.

502. The handover device obtains a distance between the terminal and the current access point based on the RTT, to determine a change trend of the distance between the terminal and the current access point.

The RTT is a time of propagation at a speed of light. A round trip distance between the terminal and the AP may be obtained by multiplying the RTT by the speed of light, and the distance between the terminal and the AP may be obtained by dividing the round trip distance by 2.

The change trend of the distance from the terminal to the current AP may be determined by comparing a distance that is from the terminal to the current AP and detected at a previous detection time with a distance that is from the terminal to the current AP and detected at a next detection time; and if the distance that is from the terminal to the current AP and detected at the previous detection time is shorter than the distance that is from the terminal to the current AP and detected at the next detection time, the change trend of the distance from the terminal to the current AP is a falling trend; or if the distance that is from the terminal to the current AP and detected at the previous detection time is longer than the distance that is from the terminal to the current AP and detected at the next detection time, the change trend of the distance from the terminal to the current AP is a rising trend.

503. If the change trend is a rising trend, the handover device determines, based on a correspondence between the change trend and a neighboring access point of the current access point, that the neighboring access point whose attribute is face to face is a target access point.

The face-to-face attribute is used to indicate that a distance between the current access point and the neighboring access point is greater than or equal to a first threshold, where the first threshold may be set according to network planning. For example, the first threshold may be specified as 600 meters. To be specific, a neighboring access point whose distance from the current access point is greater than or equal to 600 meters is a face-to-face access point.

In other words, when the change trend of the distance from the terminal to the current access point is the rising trend, that is, the distance from the terminal to the current access point is longer, it indicates that a user is driving away from the current access point. In this case, the handover device may determine that the attribute of the neighboring access point to which the terminal is to be handed over is face to face, that is, the target AP to which the terminal is to be handed over is a face-to-face neighboring AP. For example, if the current access point is an AP 1, and the current access point has two neighboring access points AP 2 and AP 0, where an attribute of the AP 2 is face to face, if a change trend of a distance from the terminal to the AP 1 is a rising trend, the handover device may determine that an attribute of a neighboring access point to which the terminal is to be handed over is face to face, and the face-to-face neighboring access point is the target access point, that is, the AP 2 is the target access point.

In addition, if the change trend is the rising trend and the handover device determines that the distance between the terminal and the current access point is greater than or equal to a first pre-handover distance threshold, the handover device obtains an RTT between the terminal and the current access point at a second frequency, where the second frequency is higher than the first frequency. The first pre-handover distance threshold is used to indicate that the terminal is to reach a handover distance for performing a network handover. The first pre-handover distance threshold may be set in the network planning, for example, may be set to 500 meters. When the terminal is to reach the handover distance, a frequency of collecting RTTs may be increased, so that the distance between the terminal and the current access point may be accurately determined for preparing for a handover. Therefore, the second frequency is higher than the first frequency. Herein, a state of obtaining an RTT between the terminal and the current access point by the handover device at the second frequency may be referred to as a pre-handover state.

If the handover device determines that the distance between the terminal and the current access point is greater than or equal to a first handover distance threshold, where the first handover distance threshold is a threshold for performing a network handover by the terminal, the handover device stops obtaining an RTT between the terminal and the current access point. Because RTTs do not need to be collected temporarily for determining the distance, collection of RTTs may be stopped during the handover to reduce overheads. Herein, a state of stopping obtaining an RTT between the terminal and the current access point by the handover device may be referred to as a handover state.

504. If the target access point is the face-to-face neighboring access point, and the distance between the terminal and the current access point is greater than or equal to a first handover distance threshold, the handover device hands over the terminal from the current access point to the target access point.

The handover device may switch a connection between the terminal and the current access point to a connection between the terminal and the target access point by instructing the current access point to send context information of the terminal and the current access point to the target access point, or by sending context information obtained from the current access point to the target access point, or by instructing the target access point to set context information to an active state.

The context information of the terminal and the current access point may include an Internet Protocol (IP) address of the current AP, a Media Access Control (MAC) address of the current AP, a MAC address of the terminal, and a BSSID to which the terminal belongs. The context information of the terminal and the current access point may further include a basic service set identifier (BSSID) of the current AP, an identifier of the current AP, a channel of the terminal, air interface capability information of the terminal, that is, a transmission rate, a Wi-Fi multimedia (WMM) capability, a high throughput (HT) capability, an aggregation capability, and the like. In order that the user is not aware of a network change, a network identifier (BSSID) of the AP in the context information of the terminal and the current access point may remain unchanged. Each terminal may correspond to a unique BSSID, or all terminals may correspond to a same BSSID. In this way, because the BSSID is unchanged, the terminal may consider that the terminal is always connected to a same AP, and therefore is not aware of a handover process.

If the target access point is the face-to-face neighboring access point, and the distance between the terminal and the current access point is greater than or equal to the first handover distance threshold, the handover device instructs the current access point to send the context information of the terminal and the current access point to the target access point, or the handover device sends the context information obtained from the current access point to the target access point. This process may be referred to as a face-to-face handover.

The first handover distance threshold may be preset in two manners: static configuration and dynamic configuration. In the static configuration, during network planning, a distance from the current access point to a middle point in an overlapping coverage area between the current access point and the face-to-face neighboring access point may be directly configured as the first handover distance threshold, for example, 600 meters, or an RTT value corresponding to 600 meters. In the dynamic configuration, the handover device requests the current access point and the face-to-face neighboring access point to mutually measure the distance between the current access point and the face-to-face neighboring access point, then calculates a median of the distance between the current access point and the face-to-face neighboring access point, and determines the median as the first handover distance threshold. A process in which the current access point and the face-to-face neighboring access point mutually measure the distance between the current access point and the face-to-face neighboring access point may be as follows: The current access point sends an RTT probe request to the face-to-face neighboring access point; the face-to-face neighboring access point returns a response; the current access point obtains an RTT based on a time difference between the request and the response; then the face-to-face neighboring access point probes the current access point to obtain an RTT; the current access point and/or the face-to-face neighboring access point report/reports the RTT to an engine of the handover device; the handover device obtains the distance between the current access point and the face-to-face neighboring access point based on the RTT reported by the current access point or the face-to-face access point, or the handover device obtains the distance between the current access point and the face-to-face neighboring access point based on an average value of RTTs reported by the current access point and the face-to-face access point. For the method for obtaining a distance based on an RTT, refer to step 502.

In an alternative manner, if the handover device receives the context information sent by the current access point, and sends the context information to the neighboring access point, when the handover device determines that the target access point is the face-to-face neighboring access point, and the distance between the terminal and the current access point is greater than or equal to the first handover distance threshold, the handover device may instruct the target access point to set the context information to a valid state or the active state to hand over the terminal to the target access point. In other words, the context information may be sent to the target access point when the handover device switches the connection between the terminal and the current access point to the connection between the terminal and the target access point, or may be sent to the neighboring access point of the current access point before the handover device switches the connection between the terminal and the current access point to the connection between the terminal and the target access point. If the context information is sent to the neighboring access point of the current access point before the handover device switches the connection between the terminal and the current access point to the connection between the terminal and the target access point, the neighboring access point may be instructed to set the context information to an invalid or pending state.

If the context information is sent to the neighboring access point of the current access point before the handover device switches the connection between the terminal and the current access point to the connection between the terminal and the target access point, the current access point sends the context information of the associated user to the handover device after the terminal starts to access the current access point; and then the handover device determines the neighboring access point of the current access point based on the attribute and a corresponding identifier of the neighboring access point of the current access point that are stored by the handover device, and further sends the context information of the associated user to the neighboring access point. For example, as shown in FIG. 3, assuming that the AP 1 is the current access point, and the attribute and the corresponding identifier of the neighboring access point of the current access point that are stored by the handover device are that a face-to-face neighboring AP and a back-to-back neighboring AP of the AP 1 are the AP 2 and the AP 0 respectively, the AP 1 sends association information of the user to the handover device after the terminal accesses the AP 1; and then the handover device sends the association information of the user that is obtained from the AP 1 to the neighboring access points AP 0 and AP 2 of the AP 1.

505. If the terminal fails to be handed over from the current access point to the target access point after the handover device hands over the terminal from the current access point to the target access point, the handover device obtains an RTT between the terminal and the current access point at a third frequency, where the third frequency is higher than or equal to the first frequency, and is lower than or equal to a second frequency.

If the handover device fails to switch the connection between the terminal and the current access point to the face-to-face neighboring access point, the handover device obtains the RTT between the terminal and the current access point at the third frequency, that is, obtains the RTT between the terminal and the current access point in the initial state. Because the handover device possibly cannot determine a location of the terminal accurately after the handover fails, RTTs need to be collected at a relatively high frequency, so that the handover device quickly determines the location of the terminal to prepare for a next handover. The third frequency is higher than or equal to the first frequency, and is lower than or equal to the second frequency. For example, assuming that the third frequency is collecting RTTs every second, the first frequency may be collecting RTTs every two seconds, and the second frequency may be collecting RTTs every 0.5 second.

506. If the handover device receives a handover request sent by the target access point, where the handover request is used to request to switch a connection between the terminal and the current access point to the target access point, the handover device determines whether a received signal strength indicator (RSSI) that is between the terminal and the target access point and sent by the target access point reaches a third threshold; and if determining yes, performs step 507.

In one case, when the handover device determines that the handover fails, if the terminal moves out of a coverage area of the current access point, that is, moves into a coverage area of the target access point, the terminal sends an uplink packet, where the uplink packet includes a WLAN management control frame, a probe request, a data frame, or the like. If the target access point detects the uplink packet of the terminal, the target access point sends the handover request to the handover device, and sends the RSSI of the packet to the handover device, and the handover device determines whether the received signal strength indicator RSSI that is between the terminal and the target access point and sent by the target access point reaches the third threshold. The third threshold may be a co-channel blind handover RSSI threshold or an inter-channel blind handover RSSI threshold, where the co-channel blind handover RSSI threshold may be a threshold for determining whether the terminal is handed over from the current access point to the target access point when the current access point and the target access point are on a same channel. The inter-channel blind handover RSSI threshold may be a threshold for determining whether the terminal is handed over from the current access point to the target access point when the target access point and the current access point are on different channels.

In another case, if the handover device does not perform step 501 to step 505 due to a poor signal or other reasons, that is, the terminal fails to be handed over from the current access point to the target access point, if the mobile terminal already moves into the coverage area of the target access point, that is, if the target access point receives the uplink packet sent by the mobile terminal, the handover device receives the RSSI that is between the terminal and the target access point and sent by the target access point, and determines whether the RSSI that is between the terminal and the target access point and sent by the target access point reaches the third threshold.

Figure 5A:
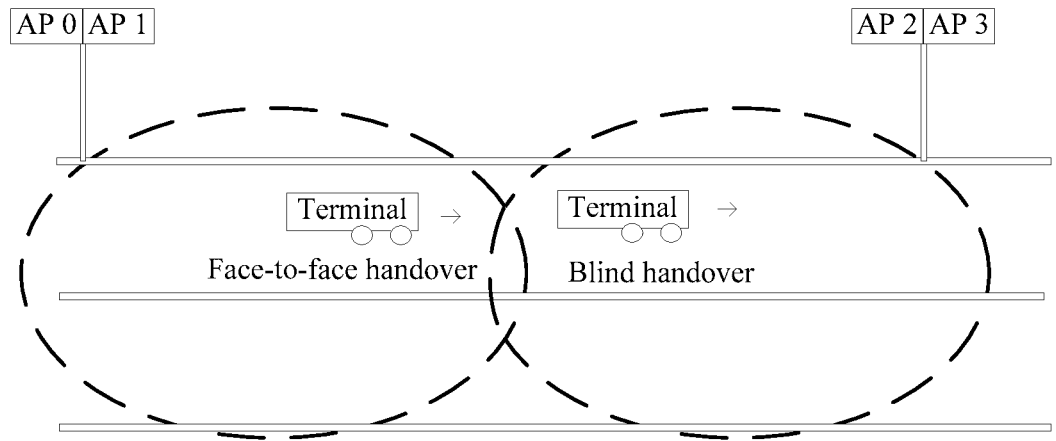
FIG. 5A is a schematic diagram of a face-to-face handover and a blind handover according to an embodiment of the present invention.

In addition, a handover process performed after the handover device receives the handover request sent by the target access point may be referred to as a blind handover. As shown in FIG. 5A, assuming that an AP 1 is the current access point of the terminal and an AP 2 is the target access point of the terminal, that is, the face-to-face neighboring access point, a face-to-face handover is a handover process initiated by the handover device when the terminal reaches the first handover distance threshold, and the blind handover is a handover process initiated by the handover device after the face-to-face handover fails.

507. The handover device instructs the current access point to send context information of the terminal and the current access point to the target access point, or the handover device sends context information obtained from the current access point to the target access point, or the handover device instructs the target access point to set context information to an active state.

In addition, after receiving the context information, the target access point may send a probe response to the terminal, where a source address field carries a BSSID allocated by the current access point to the terminal. If the current access point and the target access point are on different channels, the target access point needs to immediately send a unicast beacon to the terminal, where a source address carries the BSSID allocated by the current access point to the terminal, and also carries a channel switch announcement (CSA) parameter. A working channel of the target access point, included in the CSA parameter, is used to indicate that the terminal changes a working channel.

Then the target access point may serve the terminal. For example, the target access point delivers a service to the terminal.

If the handover device receives the context information sent by the current access point, and sends the context information to the neighboring access point, when the handover device receives the handover request sent by the target access point, and the handover device determines that the received signal strength indicator RSSI that is between the terminal and the target access point and sent by the target access point reaches the third threshold, the handover device may instruct the target access point to set the context information to the active state to hand over the terminal to the target access point.

For a specific process in which the handover device receives the context information sent by the current access point, and sends the context information to the neighboring access point, refer to step 504.

Figure 5B:
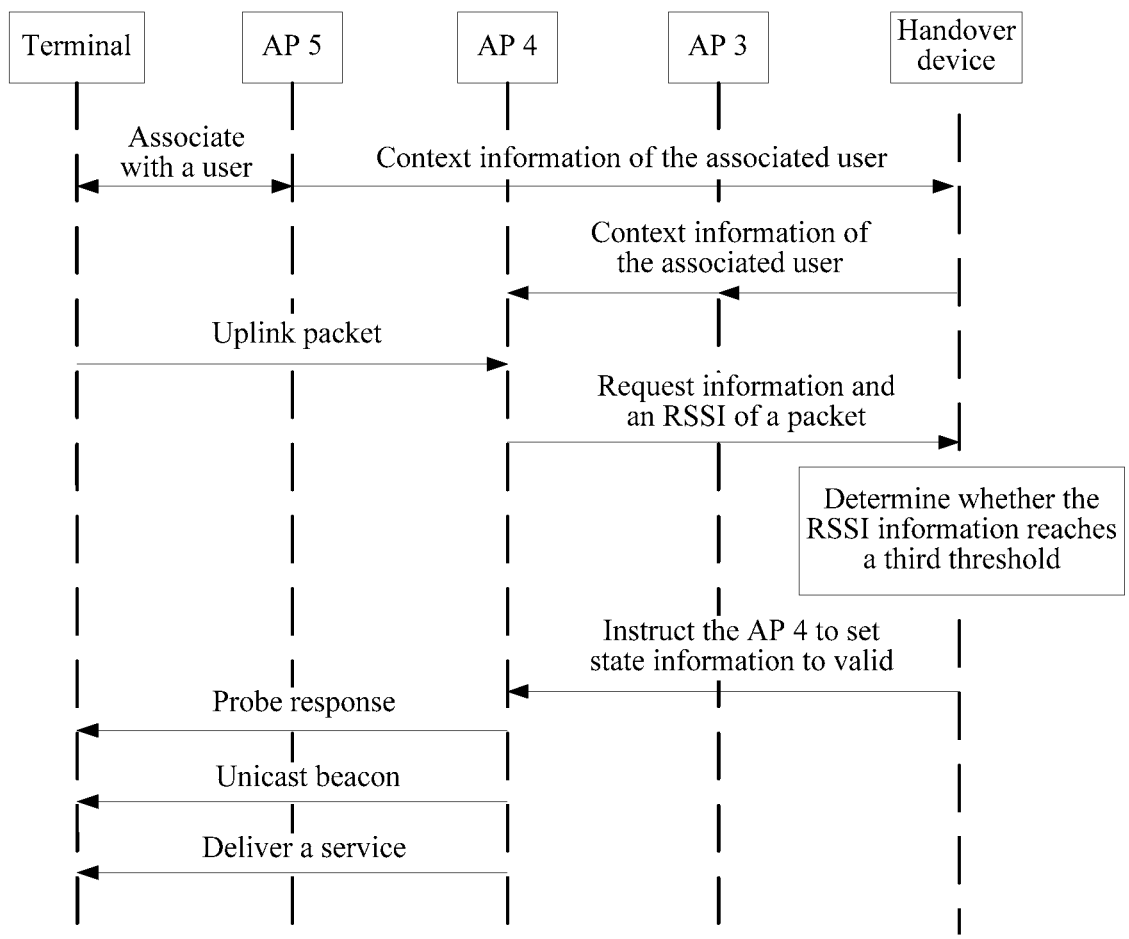
FIG. 5B is a signal interaction diagram of a blind handover according to an embodiment of the present invention.

For example, as shown in FIG. 5B, assuming that the current access point is an AP 5, and neighboring access points of the AP 5 are an AP 4 and an AP 3, after the terminal is associated with the AP 5, the AP 5 sends the context information of the associated user to the handover device; then the handover device sends, to the AP 4 and the AP 3, the context information of the associated user and sent by the AP 5. Assuming that the terminal moves from a coverage area of the AP 5 to a coverage area of the AP 4 and sends an uplink packet to the AP 4, that is, the AP 4 is the target access point of the terminal, the AP 4 sends a handover request to the handover device. In addition, when the handover device determines that the received signal strength indicator RSSI that is between the terminal and the target access point and sent by the target access point reaches the third threshold, the handover device instructs the AP 4 to set the context information to the active state. Assuming that the AP 4 and the AP 5 are located on different channels, the AP 4 may send a probe response and a unicast beacon to the terminal subsequently, so as to deliver a service to the terminal.

Figure 5C:
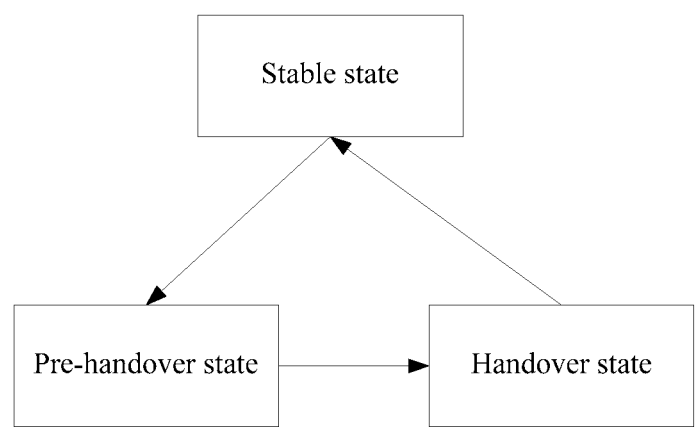
FIG. 5C is a schematic diagram of a state transition of collecting RTTs according to an embodiment of the present invention.
Figure 5D:
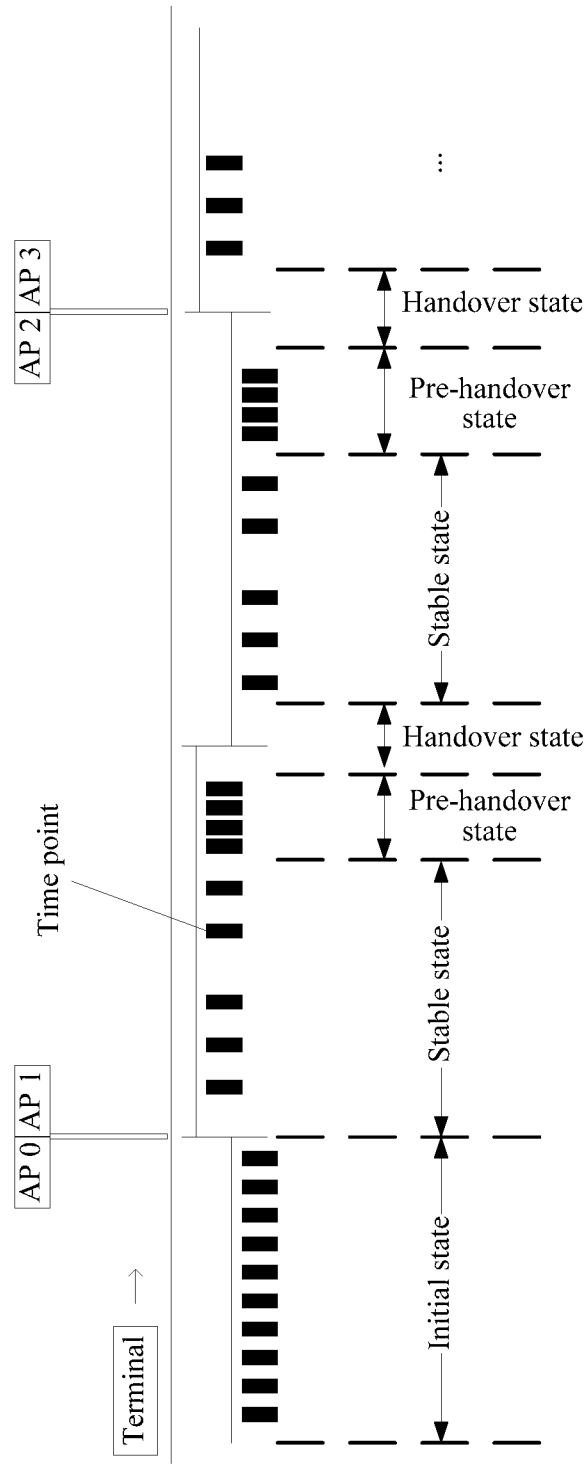
FIG. 5D is a schematic diagram of a state transition of collecting RTTs according to an embodiment of the present invention.

As can be known from the foregoing description, from determining, by the handover device, that the terminal accesses the current access point, to initiating the handover of the terminal from the current access point to the target access point by the handover device, as shown in FIG. 5C, for the state of obtaining an RTT between the terminal and the current access point by the handover device, a sequence of state transitions may be: the stable state, the pre-handover state, and the handover state. Specifically, the foregoing state transitions and functions in each state are shown in FIG. 5D. It is assumed that the current access point is an AP 1, and an access point associated before the terminal accesses the AP 1 is an AP 0, and the target access point to which the terminal is to be handed over is an AP 2, and a back-to-back neighboring AP of the AP 2 is an AP 3. Small black blocks in the figure are time points, and each time point may indicate that the handover device collects RTTs. Before the terminal accesses the AP 1, the handover device may collect RTTs between the terminal and the AP 0 in the initial state, for example, collect, every 100 milliseconds, RTTs between the terminal and the AP previously associated with the terminal. After determining that the terminal accesses the AP 1, the handover device first collects RTTs between the terminal and the current access point in the stable state, for example, obtains RTTs between the terminal and the current access point in a manner of probing for three seconds, closing for four seconds, then probing for two seconds, closing for two seconds, . . . . When a result obtained through calculation based on the collected RTTs shows that a distance between the terminal and the AP 1 is greater than or equal to a pre-handover distance threshold, the handover device may collect RTTs between the terminal and the AP 1 in the pre-handover state, for example, obtain, at a frequency of probing every 100 milliseconds, RTTs between the terminal and the AP previously associated with the terminal. When a result obtained through calculation based on the collected RTTs shows that a distance between the terminal and the AP 1 is greater than or equal to a handover distance threshold, the handover device collects RTTs between the terminal and the AP 1 in the handover state, that is, stops collecting RTTs between the terminal and the AP 1. When the terminal completes the handover process and accesses the AP 2, the handover device may continue to collect RTTs between the terminal and the AP 2 in a sequence of the stable state, the pre-handover state, and the handover state. If the handover device fails to switch the connection between the terminal and the current access point to the connection between the terminal and the target access point, the handover device may collect RTTs between the terminal and the AP 2 in the initial state.

In this way, when the handover device determines that the change trend of the distance between the terminal and the current access point is larger, the handover device may determine that the target access point during the handover of the terminal is the face-to-face neighboring access point. When the distance between the terminal and the current access point reaches the first handover distance threshold, the handover device may hand over the terminal from the current access point to the target access point by instructing the current access point to send the context information of the terminal and the current access point to the target access point, or by sending the context information obtained from the current access point to the target access point, or by instructing the target access point to set the context information to the active state. In a conventional roaming handover process initiated by a terminal to a target AP due to a reassociation, the terminal is temporarily disconnected from a wireless network, and therefore a service packet loss is caused in the roaming handover process due to the reassociation. Compared with the conventional process, in this application, the handover process is initiated by the handover device. Therefore, the terminal may not be aware of the whole handover process, and a problem of a service packet loss during the handover of the terminal is resolved.

Figure 6:
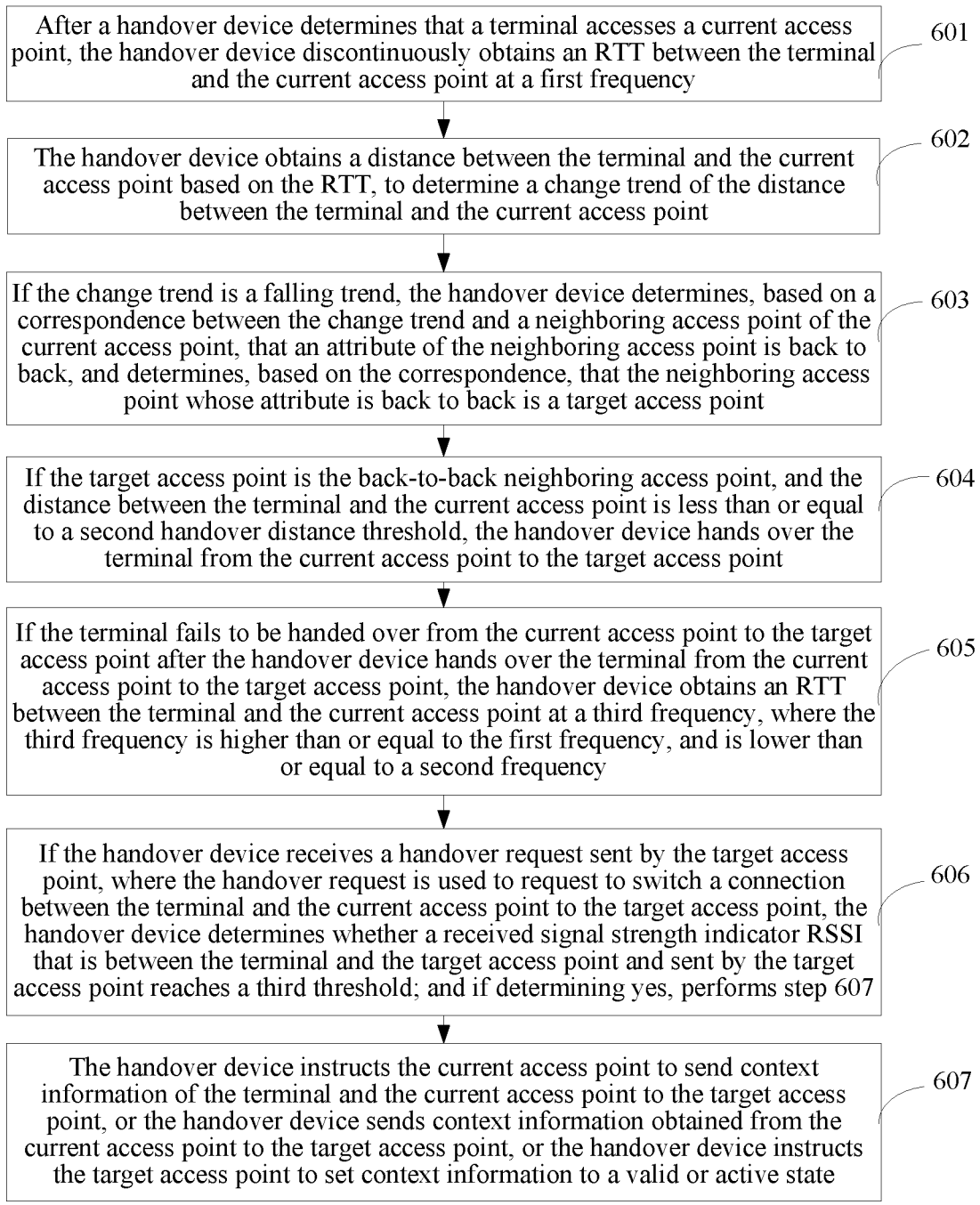
FIG. 6 is a schematic flowchart of a wireless network handover method according to an embodiment of the present invention.

An embodiment of this application provides a wireless network handover method. As shown in FIG. 6, the method includes the following steps.

601. After a handover device determines that a terminal accesses a current access point, the handover device discontinuously obtains an RTT between the terminal and the current access point at a first frequency.

602. The handover device obtains a distance between the terminal and the current access point based on the RTT, to determine a change trend of the distance between the terminal and the current access point.

For a specific process, refer to step 502.

603. If the change trend is a falling trend, the handover device determines, based on a correspondence between the change trend and a neighboring access point of the current access point, that the neighboring access point whose attribute is back to back is a target access point.

The back-to-back attribute is used to indicate that the distance between the current access point and the neighboring access point is less than or equal to a second threshold, where the second threshold may be set according to network planning. For example, a neighboring access point whose distance from the current access point is 50 meters may be specified as a back-to-back access point.

When the change trend of the distance from the terminal to the current access point is the falling trend, that is, the distance from the terminal to the current access point is shorter, it indicates that a user is driving towards the current access point. In this case, the handover device may determine that the attribute of the neighboring access point to which the terminal is to be handed over is back to back, that is, the handover target is a back-to-back neighboring AP. The handover device may determine the target access point based on a corresponding identifier of the back-to-back neighboring AP. For example, if the current access point is an AP 1, and the current access point has two neighboring access points AP 2 and AP 0, where an attribute of the AP 0 is back to back, if a change trend of a distance from the terminal to the AP 1 is a falling trend, the handover device may determine that an attribute of a neighboring access point to which the terminal is to be handed over is back to back, and the back-to-back neighboring access point is the target access point, that is, the AP 0 is the target access point.

In addition, if the change trend is the falling trend and the handover device determines that the distance between the terminal and the current access point is less than or equal to a second pre-handover distance threshold, where the second pre-handover distance threshold is used to indicate that the terminal is to reach a handover distance, the handover device obtains an RTT between the terminal and the current access point at a second frequency, where the second frequency is higher than the first frequency, because when the distance between the terminal and the current access point is less than or equal to the second pre-handover distance threshold, the terminal is to be handed over. Therefore, RTTs need to be collected at a higher frequency, so that the handover device knows a location of the terminal more accurately. For a target access point that is a back-to-back access point, the second pre-handover distance threshold may be set in network planning, for example, set to 60 meters.

If the handover device determines that the distance between the terminal and the current access point is less than or equal to a second handover distance threshold, where the second handover distance threshold is used to indicate that the terminal reaches a handover distance for performing a network handover, the handover device stops obtaining an RTT between the terminal and the current access point. After the terminal moves out of a coverage area of the current access point and roams and is handed over to the target AP, the handover device may first obtain an RTT between the terminal and the next access point temporarily in a stable state.

604. If the target access point is the back-to-back neighboring access point, and the distance between the terminal and the current access point is less than or equal to a second handover distance threshold, the handover device hands over the terminal from the current access point to the target access point.

Specifically, when the target access point is the back-to-back neighboring access point, and the distance between the terminal and the current access point is less than or equal to the second handover distance threshold, the handover device instructs the current access point to send context information of the terminal and the current access point to the target access point, or the handover device sends context information obtained from the current access point to the target access point. This process may be referred to as a back-to-back handover.

The second handover distance threshold may be preset in two manners: static configuration and dynamic configuration. In the static configuration, during network planning, a distance from the current access point to a middle point in an overlapping coverage area between the current access point and the back-to-back neighboring access point may be directly configured as the second handover distance threshold, for example, 60 meters, or an RTT time value corresponding to 60 meters. In the dynamic configuration, the handover device requests two APs to mutually measure a distance between the two APs, then calculates a median of the distance between the two APs, and determines the median as the second handover distance threshold.

In an alternative manner, if the handover device receives the context information sent by the current access point, and sends the context information to the neighboring access point, when the handover device determines that the target access point is the back-to-back neighboring access point, and the distance between the terminal and the current access point is less than or equal to the second handover distance threshold, the handover device may instruct the target access point to set the context information to an active state to hand over the terminal to the target access point.

Figure 6A:
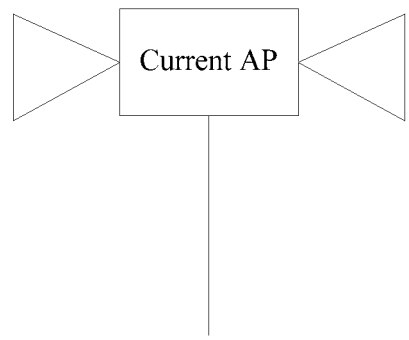
FIG. 6A is a schematic diagram of deploying a current AP according to an embodiment of the present invention.

A deployment mode used in step 603 and step 604 is that two APs are deployed on a same pole, and the two APs respectively cover one direction. In another alternative deployment solution, as shown in FIG. 6A, one AP is deployed on one pole, but the AP is connected to two antennas that respectively cover different directions. An alternative manner of step 603 to step 604 is: if the terminal communicates with the current access point by using a right antenna of the current AP, and the change trend is a falling trend, the handover device determines to instruct the current AP to select a left antenna to communicate with the wireless terminal.

605. If the terminal fails to be handed over from the current access point to the target access point after the handover device hands over the terminal from the current access point to the target access point, the handover device obtains an RTT between the terminal and the current access point at a third frequency, where the third frequency is higher than or equal to the first frequency, and is lower than or equal to a second frequency.

In other words, if the handover device fails to switch a connection between the terminal and the current access point to the back-to-back neighboring access point, the handover device may obtain the RTT between the terminal and the current access point at the third frequency, that is, obtains the RTT between the terminal and the current access point in an initial state.

606. If the handover device receives a handover request sent by the target access point, where the handover request is used to request to switch a connection between the terminal and the current access point to the target access point, the handover device determines whether a received signal strength indicator RSSI that is between the terminal and the target access point and sent by the target access point reaches a third threshold; and if determining yes, performs step 607.

For a specific process, refer to step 506.

Figure 6B:
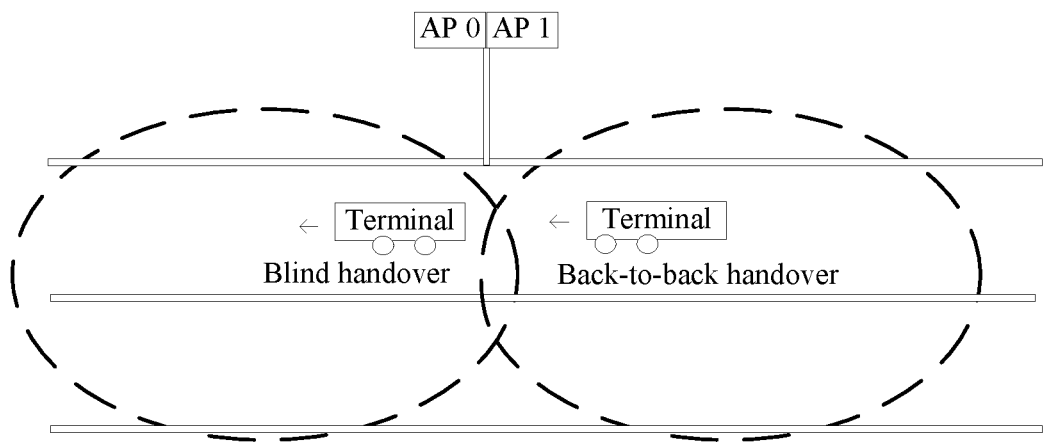
FIG. 6B is a schematic diagram of a back-to-back handover and a blind handover according to an embodiment of the present invention.

In addition, a handover process performed after the handover device receives the handover request sent by the target access point may be referred to as a blind handover. As shown in FIG. 6B, assuming that an AP 1 is the current access point of the terminal, and an AP 0 is the target access point of the terminal, that is, the back-to-back neighboring access point, the back-to-back handover in the figure is a handover process initiated by the handover device when the terminal is in the coverage area of the current access point, and the blind handover in the figure is a handover process initiated by the handover device after the back-to-back handover fails.

607. The handover device instructs the current access point to send context information of the terminal and the current access point to the target access point, or the handover device sends context information obtained from the current access point to the target access point, or the handover device instructs the target access point to set context information to an active state.

For a specific process, refer to step 507.

In this way, when the handover device determines that the change trend of the distance between the terminal and the current access point is smaller, the handover device may determine that the target access point during the handover of the terminal is the back-to-back neighboring access point. When the distance between the terminal and the current access point reaches the second handover distance threshold, the handover device may hand over the terminal from the current access point to the target access point by instructing the current access point to send the context information of the terminal and the current access point to the target access point, or by sending the context information obtained from the current access point to the target access point, or by instructing the target access point to set the context information to the active state. In a conventional roaming handover process initiated by a terminal to a target AP due to a reassociation, the terminal is temporarily disconnected from a wireless network, and therefore a service packet loss is caused in the roaming handover process due to the reassociation. Compared with the conventional process, in this application, the handover process is initiated by the handover device. Therefore, the terminal may not be aware of the whole handover process, and a problem of a service packet loss during the handover of the terminal is resolved.

The solutions provided by the embodiments of this application are described above from a perspective of the handover device. It may be understood that, to implement the foregoing functions, the handover device includes corresponding hardware structures and/or software modules for performing the functions. A person skilled in the art should be easily aware that, algorithm steps described with reference to the embodiments disclosed in the specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional modules in the handover device may be defined based on the foregoing method examples. For example, each functional module may be defined in a correspondence to each function, or two or more functions may be integrated in one processing module. The integrated module may be implemented in a form of hardware, or may be implemented in a form of a software functional module. It should be noted that, division of modules in the embodiments of this application is merely an example, and is only division of logical functions. Other division manners may be available in actual implementations.

Figure 7:
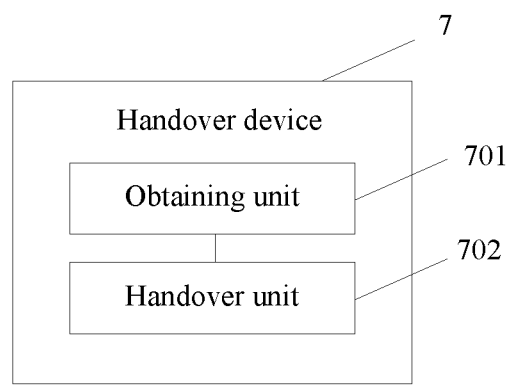
FIG. 7 is a schematic structural diagram of a handover device according to an embodiment of the present invention.

When each functional module is defined in a correspondence to each function, FIG. 7 shows a possible schematic structural diagram of a handover device 7 used in the foregoing embodiment. The handover device includes an obtaining unit 701 and a handover unit 702. The obtaining unit 701 is configured to support the handover device in performing processes 501, 504, and 505 in FIG. 5, and processes 601, 604, and 605 in FIG. 6. The handover unit 702 is configured to support the handover device in performing processes 502, 503, 506 and 507 in FIG. 5, and processes 602, 603, 606, and 607 in FIG. 6. All related content of steps in the foregoing method embodiments may be cited in function descriptions of corresponding functional modules. Details are not described again herein.

When an integrated unit is used, FIG. 4 shows a possible schematic structural diagram of a handover device used in the foregoing embodiment. The handover device includes a processing module 401 and a communications module 402. The processing module 401 is configured to control and manage actions of the handover device. For example, the processing module 401 is configured to support the handover device in performing processes 503 to 506 in FIG. 5, and processes 603 to 606 in FIG. 6. The communications module 402 is configured to support the handover device in communicating with other network entities, for example, communicating with a server, and downloading and obtaining an installation package of an application from the server, and the like. The handover device may further include a storage module 403, configured to store program code and data of the handover device, for example, configured to store the first threshold, the second threshold, and the like in the embodiments of this application.

The processing module 401 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communications module 402 may be a transceiver, a transceiver circuit, or a communications interface. The storage module 403 may be a memory.

Figure 8:
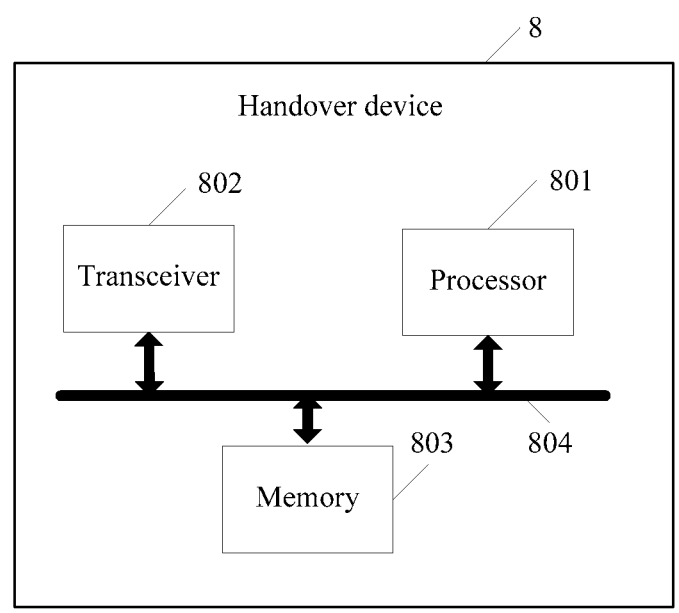
FIG. 8 is a schematic structural diagram of a handover device according to an embodiment of the present invention.

When the processing module 401 is a processor, and the communications module 402 is a transceiver, and the storage module 403 is a memory, the handover device used in this embodiment of this application may be a handover device shown in FIG. 8.

Referring to FIG. 8, the handover device 8 includes a processor 801, a transceiver 802, a memory 803, and a bus 804. The transceiver 802, the processor 801, and the memory 803 are interconnected by the bus 804. The bus 804 may be a peripheral component interconnect standard (PCI) bus, or an extended industry standard architecture (EISA) bus, or the like. The bus may be classified into an address bus, a data bus, a control bus, and the like. For ease of representation, only one thick line is used to represent the bus in FIG. 8, but this does not mean that there is only one bus or only one type of bus.

Method or algorithm steps described in combination with the content disclosed in this application may be implemented by hardware, or may be implemented by a processor by executing a software instruction. The software instruction may be formed by a corresponding software module. The software module may be located in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made within the solution of this application shall fall within the protection scope of this application.

What is claimed is:

1. A wireless network handover method, comprising:
obtaining, by a handover device, a distance between a terminal and a current access point, to determine a change trend of the distance between the terminal and the current access point; and
if the handover device determines, based on the change trend and at least one neighboring access point of the current access point, a target access point to which the terminal is to be handed over, handing over, by the handover device, the terminal from the current access point to the target access point; and,
wherein that the handover device determines, based on the change trend and the neighboring access point of the current access point, the target access point to which the terminal is to be handed over comprises:
if the change trend is a falling trend, determining, by the handover device, a face-to-face neighboring access point of the at least one neighboring access point arranged face to face with respect to the current access point as the target access point, wherein the face-to-face neighboring access point is deployed on a pole adjacent a pole where the current access point is deployed, and the face-to-face neighboring access point and the current access point cover different directions, the adjacent poles are deployed along a highway;

if the change trend is a falling trend, determining, by the handover device, a back-to-back neighboring access point of the at least one neighboring access point arranged back to back with respect to the current access point as the target access point, wherein the back-to-back neighboring access point is deployed on a same pole where the current access point is deployed and the back-to-back neighboring access point and the current access point cover different directions;

wherein the handover device stores respective attributes and corresponding identifiers of the at least one neighboring access point and performs the handing over the terminal from the current access point to the target access point based on the stored attributes and corresponding identifiers, and wherein the attributes each indicate whether the at least one neighboring access point is the face-to-face neighboring access point or the back-to-back neighboring access point.

2. The method according to claim 1, wherein handing over, by the handover device, the terminal from the current access point to the target access point comprises:

if the target access point is the face-to-face neighboring access point, and the distance between the terminal and the current access point is greater than or equal to a first handover distance threshold, handing over, by the handover device, the terminal from the current access point to the target access point; and if the target access point is the back-to-back neighboring access point, and the distance between the terminal and the current access point is less than or equal to a second handover distance threshold, handing over, by the handover device, the terminal from the current access point to the target access point.

3. The method according to claim 1, wherein if the handover device determines that the terminal fails to be handed over to the target access point, the method further comprises:

if the handover device receives a handover request sent by the target access point, wherein the handover request is used to request to switch a connection between the terminal and the current access point to a connection between the terminal and the target access point, determining, by the handover device, whether a received signal strength indicator (RSSI) that is between the terminal and the target access point and sent by the target access point reaches a third threshold; and if the RSSI is determined to have reached the third threshold, handing over, by the handover device, the terminal from the current access point to the target access point.

4. The method according to claim 1, wherein if the terminal fails to be handed over from the current access point to the target access point after the handover device hands over the terminal from the current access point to the target access point, the method further comprises:

if the handover device receives a handover request sent by the target access point, wherein the handover request is used to request to switch a connection between the terminal and the current access point to a connection between the terminal and the target access point, determining, by the handover device, whether a received signal strength indicator (RSSI) that is between the terminal and the target access point and sent by the target access point reaches a third threshold; and if the RSSI is determined to have reached the third threshold, handing over, by the handover device, the terminal from the current access point to the target access point.

5. The method according to claim 2, wherein handing over, by the handover device, the terminal from the current access point to the target access point comprises:

instructing, by the handover device, the current access point to send context information of the terminal and the current access point to the target access point, or sending, by the handover device, context information obtained from the current access point to the target access point, or instructing, by the handover device, the target access point to set context information to an active state.

6. The method according to claim 5, wherein if the handover device instructs the target access point to set the context information to the active state, the method further comprises:

receiving, by the handover device, the context information sent by the current access point, and sending the context information to the at least one neighboring access point.

7. The method according to claim 1, wherein the obtaining, by a handover device, a distance between a terminal and a current access point comprises:

obtaining, by the handover device, a round trip time (RTT) between the terminal and the current access point; and obtaining, by the handover device, the distance between the terminal and the current access point based on the RTT.

8. The method according to claim 1, wherein the method further comprises:

after the handover device determines that the terminal accesses the current access point, discontinuously obtaining, by the handover device, a first RTT between the terminal and the current access point at a first frequency, and obtaining the distance between the terminal and the current access point based on the first RTT; and after the handover device determines that the terminal accesses the current access point, if the change trend is the rising trend and the distance between the terminal and the current access point is greater than or equal to a first pre-handover distance threshold, or if the change trend is the falling trend and the distance between the terminal and the current access point is less than or equal to a second pre-handover distance threshold, obtaining, by the handover device, a second RTT between the terminal and the current access point at a second frequency, wherein the second frequency is higher than the first frequency, and obtaining the distance between the terminal and the current access point based on the second RTT.

9. The method according to claim 8, wherein the method further comprises:

after the handover device determines that the terminal accesses the current access point, and if the terminal fails to be handed over from the current access point to the target access point, obtaining, by the handover device, a third RTT between the terminal and the current access point at a third frequency, wherein the third frequency is higher than or equal to the first frequency, and is lower than or equal to the second frequency, and obtaining the distance between the terminal and the current access point based on the third RTT.

10. A handover device, comprising:
a receiver, configured to: obtain a distance between a terminal and a current access point; and determine a change trend of the distance between the terminal and the current access point; and
a processor configured to: if determining, based on the change trend and at least one neighboring access point of the current access point, a target access point to which the terminal is to be handed over, switch a connection between the terminal and the current access point to a connection between the terminal and the target access point; and,
wherein the processor is configured to:
if the change trend is a rising trend, determine a face-to-face neighboring access point of the at least one neighboring access point arranged face to face with respect to the current access point as the target access point, wherein the face-to-face-neighboring access point is deployed on a pole adjacent a pole where the currently access point is deployed and the face-to-face neighboring access point and the current access point cover different directions, the adjacent poles are deployed along a highway; and
if the change trend is a falling trend, determine a back-to-back neighboring access point of the at least one neighboring access point arranged back to back with respect to the current access point as the target access point, wherein the back-to-back neighboring access point is deployed on a same pole where the current access point is deployed and the back-to-back neighboring access point and the current access point cover different directions:
wherein the handover device stores respective attributes and corresponding identifiers of the at least one neighboring access point and performs the handing over the terminal from the current access point to the target access point based on the stored attributes and corresponding identifiers, and wherein the attributes each indicates whether the at least one neighboring access point is the face-to-face neighboring access point or the back-to-back neighboring access point.

11. The handover device according to claim 10, wherein the processor is configured to:
if the target access point is the face-to-face neighboring access point, and the distance between the terminal and the current access point is greater than or equal to a first handover distance threshold, hand over the terminal from the current access point to the target access point; and
if the target access point is the back-to-back neighboring access point, and the distance between the terminal and the current access point is less than or equal to a second handover distance threshold, hand over the terminal from the current access point to the target access point.

12. The handover device according to claim 10, wherein if the handover device determines that the terminal fails to be handed over to the target access point, the processor is further configured to:

if the handover device receives a handover request sent by the target access point, wherein the handover request is used to request to switch a connection between the terminal and the current access point to a connection between the terminal and the target access point, determine whether a received signal strength indicator (RSSI) that is between the terminal and the target access point and sent by the target access point reaches a third threshold; and
if the RSSI is determined to have reached the third threshold, hand over, by the handover device, the terminal from the current access point to the target access point.

13. The handover device according to claim 10, wherein if the terminal fails to be handed over from the current access point to the target access point after the handover device hands over the terminal from the current access point to the target access point, the processor is further configured to:
if a handover request sent by the target access point is received, wherein the handover request is used to request to switch a connection between the terminal and the current access point to the target access point, determine whether a received signal strength indicator (RSSI) that is between the terminal and the target access point and sent by the target access point reaches a third threshold; and
if the RSSI is determined to have reached the third threshold, hand over, by the handover device, the terminal from the current access point to the target access point.

14. The handover device according to claim 11, wherein the processor is configured to:
instruct the current access point to send context information of the terminal and the current access point to the target access point, or send context information obtained from the current access point to the target access point, or instruct the target access point to set context information to an active state.

15. The method according to claim 1, wherein the method further comprises:
after the handover device determines that the terminal accesses the current access point, discontinuously obtaining, by the handover device, an RTT between the terminal and the current access point at a first frequency, and obtaining the distance between the terminal and the current access point based on the RTT; and
after the handover device determines that the terminal accesses the current access point, if the change trend is the rising trend and the distance between the terminal and the current access point is greater than or equal to a first handover distance threshold, or if the change trend is the falling trend and the distance between the terminal and the current access point is less than or equal to a second handover distance threshold, stopping, by the handover device, obtaining any RTT between the terminal and the current access point.

* * * * *

UNITED STATES PATENT AND TRADEMARK OFFICE
CERTIFICATE OF CORRECTION

PATENT NO. : 11,246,076 B2
APPLICATION NO. : 16/438632
DATED : February 8, 2022
INVENTOR(S) : Yungui Wang et al.

Page 1 of 1

It is certified that error appears in the above-identified patent and that said Letters Patent is hereby corrected as shown below:

In the Claims

In Column 22, Line 60, in Claim 1, delete "falling" and insert -- rising --.

In Column 25, Line 21, in Claim 10, delete "face-neighboring" and insert -- face neighboring --.

In Column 25, Line 35, in Claim 10, delete "directions:" and insert -- directions; --.

Signed and Sealed this
Twenty-eighth Day of June, 2022

Katherine Kelly Vidal
*Director of the United States Patent and Trademark Office*